US012635040B2

(12) United States Patent
Mishra et al.

(10) Patent No.: US 12,635,040 B2
(45) Date of Patent: May 19, 2026

(54) METHOD OF MAKING E-VAPING CARTRIDGE WITH HYDROGEL IN CAVITY

(71) Applicant: Altria Client Services LLC, Richmond, VA (US)

(72) Inventors: Munmaya K. Mishra, Manakin Sabot, VA (US); Shaoyong Yu, Glen Allen, VA (US); Raymond W. Lau, Glen Allen, VA (US); Pauline Marcq, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/492,168

(22) Filed: Oct. 23, 2023

(65) Prior Publication Data

US 2024/0057221 A1 Feb. 15, 2024

Related U.S. Application Data

(62) Division of application No. 16/987,692, filed on Aug. 7, 2020, now Pat. No. 11,825,566, which is a division (Continued)

(51) Int. Cl.

| | |
|---|---|
| ***H05B 1/02*** | (2006.01) |
| ***A24D 3/17*** | (2020.01) |

(Continued)

(52) U.S. Cl.

CPC ............. *H05B 1/0297* (2013.01); *A24D 3/17* (2020.01); *A24F 40/20* (2020.01); *A24F 40/30* (2020.01);

(Continued)

(58) Field of Classification Search

CPC ...... H05B 1/0244; H05B 3/0014; H05B 3/12; H05B 2203/021; H05B 3/10; H05B 3/16;

(Continued)

(56) References Cited

U.S. PATENT DOCUMENTS

| | | | |
|---|---|---|---|
| 1,674,558 | A | 6/1928 | Miller |
| 3,356,094 | A | 12/1967 | Ellis et al. |

(Continued)

FOREIGN PATENT DOCUMENTS

| | | | |
|---|---|---|---|
| CN | 1656578 | A | 8/2005 |
| CN | 101731757 | A | 6/2010 |

(Continued)

OTHER PUBLICATIONS

Office Action, dated Apr. 24, 2024, issued in U.S. Appl. No. 16/890,307.

(Continued)

*Primary Examiner* — Chris Q Liu

(74) *Attorney, Agent, or Firm* — Harness, Dickey & Pierce, P.L.C.

(57) ABSTRACT

The method includes establishing a housing defining a first channel, the first channel having a first end and a second end, the first end of the channel being in communication with an air inlet that traverse through the housing, configuring a heater to heat a pre-vapor formulation to form a vapor within the first channel, defining a cavity near the second end of the first channel, and inserting a hydrogel in the cavity.

19 Claims, 4 Drawing Sheets

Related U.S. Application Data of application No. 14/926,878, filed on Oct. 29, 2015, now Pat. No. 10,849,358.

(60) Provisional application No. 62/072,058, filed on Oct. 29, 2014.

(51) Int. Cl.

| | |
|---|---|
| ***A24F 40/10*** | (2020.01) |
| ***A24F 40/20*** | (2020.01) |
| ***A24F 40/30*** | (2020.01) |
| ***A24F 40/42*** | (2020.01) |
| ***H05B 3/44*** | (2006.01) |

(52) U.S. Cl.
CPC ............... *A24F 40/42* (2020.01); *H05B 3/44* (2013.01); *A24F 40/10* (2020.01)

(58) Field of Classification Search
CPC ...... H05B 3/42; H05B 3/44; H05B 2203/003; H05B 2203/017; H05B 3/0019; H05B 3/265; H05B 3/46
USPC .......................... 219/552; 392/386, 394, 395
See application file for complete search history.

(56) References Cited

U.S. PATENT DOCUMENTS

| | | | |
|---|---|---|---|
| 4,981,608 | A | 1/1991 | Gunther |
| 5,240,016 | A | 8/1993 | Nichols et al. |
| 7,600,518 | B2 | 10/2009 | Oglesby et al. |
| 8,528,569 | B1 | 9/2013 | Newton |
| 8,714,161 | B2 | 5/2014 | Liu |
| 9,078,473 | B2 | 7/2015 | Worm et al. |
| 2007/0082059 | A1 | 4/2007 | Duneas et al. |
| 2009/0235941 | A1 | 9/2009 | Chida et al. |
| 2010/0303969 | A1 | 12/2010 | Sengupta et al. |
| 2012/0000481 | A1 | 1/2012 | Potter et al. |
| 2012/0037172 | A1 | 2/2012 | Allen et al. |
| 2013/0037041 | A1 | 2/2013 | Worm et al. |
| 2013/0160765 | A1 | 6/2013 | Liu |
| 2013/0192615 | A1 | 8/2013 | Tucker et al. |
| 2013/0192620 | A1 | 8/2013 | Tucker et al. |
| 2013/0192622 | A1 | 8/2013 | Tucker et al. |
| 2013/0192623 | A1 | 8/2013 | Tucker et al. |
| 2013/0255702 | A1 | 10/2013 | Griffith, Jr. et al. |
| 2014/0060554 | A1 | 3/2014 | Collett et al. |
| 2014/0064715 | A1 | 3/2014 | Greim et al. |
| 2014/0088045 | A1 | 3/2014 | Rigas et al. |
| 2014/0150785 | A1 | 6/2014 | Malik et al. |
| 2014/0251354 | A1 | 9/2014 | Zheng |
| 2014/0261486 | A1 | 9/2014 | Potter et al. |
| 2015/0013701 | A1 | 1/2015 | Liu |
| 2015/0020822 | A1 | 1/2015 | Janardhan et al. |
| 2015/0027454 | A1 | 1/2015 | Li et al. |
| 2015/0027455 | A1 | 1/2015 | Peleg et al. |
| 2015/0027464 | A1 | 1/2015 | Liu |
| 2015/0027468 | A1 | 1/2015 | Li et al. |
| 2015/0059784 | A1 | 3/2015 | Liu |
| 2015/0164143 | A1 | 6/2015 | Maas |
| 2016/0120224 | A1* | 5/2016 | Mishra .................... A24F 40/30 392/404 |

FOREIGN PATENT DOCUMENTS

| | | | |
|---|---|---|---|
| CN | 102960852 | A | 3/2013 |
| CN | 203378563 | U | 1/2014 |
| CN | 103906784 | A | 7/2014 |
| CN | 103960783 | A | 8/2014 |
| CN | 103960784 | A | 8/2014 |
| CN | 105899095 | A | 8/2016 |
| CN | 106998811 | B | 5/2021 |
| DE | 102009015582 | A1 | 10/2010 |
| EP | 0845220 | A1 | 6/1998 |
| EP | 1897626 | A1 | 3/2008 |
| WO | WO-2011054516 | A2 | 5/2011 |
| WO | WO-2011/117752 | A2 | 9/2011 |
| WO | WO-2012/019533 | A1 | 2/2012 |
| WO | WO-2013/116572 | A1 | 8/2013 |
| WO | WO-2013128176 | A1 | 9/2013 |
| WO | WO-2014/037794 | A2 | 3/2014 |
| WO | 2015071682 | A1 | 5/2015 |

OTHER PUBLICATIONS

Final Office Action, dated Jan. 9, 2024, issued in U.S. Appl. No. 16/890,307.

European Office Action for corresponding EP Application 19171160.5 dated Nov. 7, 2023 (6 pages).

Transmittal of International Search Report and Written Opinion from corresponding International Application No. PCT/US2015/058075, dated Jan. 14, 2016.

Notification of Transmittal of International Search Report and Written Opinion and International Search Report and Written Opinion from related International Application PCT/US2016/038960, dated Nov. 29, 2016.

International Search Report and Written Opinion from corresponding international application PCT/US2015/058075, dated May 2, 2017.

U.S. Office Action issued Jun. 14, 2017 in U.S. Appl. No. 14/926,878.

U.S. Office Action issued Nov. 29, 2017 in U.S. Appl. No. 14/926,878.

Extended European Search Report dated Jun. 14, 2018 in related EP Application No. 158540140.1.

Eurasian Office Action issued Jan. 15, 2019 in corresponding Eurasian Application No. 201790930, with an English translation.

Chinese Office Action issued Aug. 14, 2019 in corresponding Chinese Application 201580059390.2, with an English language translation.

International Search Report and Written Opinion dated Jan. 14, 2016 issued in International Application No. PCT/US2015/058018.

International Preliminary Report on Patentability dated May 11, 2017 issued in corresponding International Application No. PCT/US2015/058018.

Search Report for corresponding European Application No. 15853808.2 dated Jun. 6, 2018.

Office Action for corresponding Eurasian Application No. 201790936 dated May 31, 2018 and English translation thereof.

Extended European Search Report dated Sep. 28, 2018 issued in corresponding European Application No. 15853808.2-1105/3212017.

Office Action for corresponding Eurasian Application No. 201790936 dated Dec. 13, 2018 and English translation thereof.

Chinese Office Action dated May 31, 2019 for corresponding Chinese Application No. 201580060069.6.

Extended European Search Report dated Sep. 27, 2019 for corresponding European Application No. 19171160.5.

Israeli Official Notification issued Feb. 20, 2020 in Israeli Application No. 251446.

Non-Final Office Action issued Jul. 13, 2018 in U.S. Appl. No. 14/927,072.

Final Office Action issued Feb. 7, 2019 in U.S. Appl. No. 14/927,072.

Non-Final Office Action issued Aug. 27, 2019 in U.S. Appl. No. 14/927,072.

Chinese Office Action dated Feb. 27, 2020 for corresponding Chinese Application No. 201580060069.6.

Notice of Allowance issued Mar. 9, 2020 in U.S. Appl. No. 14/927,072.

Office Action issued Mar. 5, 2020 in Ukraine Application No. a201911464.

Notice of Allowance dated Mar. 24, 2020 for corresponding U.S. Appl. No. 14/926,878.

Eurasian Notification dated May 14, 2020 for corresponding Eurasian Application No. 201790936.

Ukrainian Office Action dated Jun. 9, 2020, issued in corresponding Ukrainian Patent Application No. a201705113.

Chinese Office Action dated Jun. 3, 2020 for corresponding Chinese Application No. 201580060069.6.

(56) References Cited

OTHER PUBLICATIONS

Chinese Office Action dated Oct. 29, 2020, issued in corresponding Chinese Application No. 201580060069.6.
Substantive Examination Adverse Report dated Nov. 12, 2020, issued in corresponding Malaysian Patent Application No. PI 2017000610.
Official Notification dated Feb. 28, 2021, issued in corresponding Israeli Application No. 251889.
Ukrainian Decision of Grant dated Feb. 8, 2021, issued in corresponding Ukrainian Patent Application No. a201705113.
European Communication dated Dec. 7, 2021, issued in corresponding European Patent Application No. 19 171 160.5.
Office Action dated Feb. 1, 2022, issued in corresponding U.S. Appl. No. 16/890,307.
Office Action dated Apr. 26, 2022, issued in corresponding U.S. Appl. No. 16/890,307.
Master of Clouds, 100 FT-22 Gauge Kanthal A1 Round Wire (Year: 2015).
Office Action dated Oct. 18, 2022, issued in corresponding U.S. Appl. No. 16/890,307.
Office Action dated Mar. 8, 2023, issued in corresponding U.S. Appl. No. 16/890,307.
Office Action dated Sep. 6, 2023, issued in corresponding U.S. Appl. No. 16/890,307.
Extended Eureopan Search Report, dated Oct. 28, 2024, issued in European Patent Application No. 24194975.9.
Malaysian Examination Report dated Jun. 5, 2024 for MY Application PI2020005640 (3 pages).
Chinese Office Action for CN Application 202110471500.3 dated Dec. 4, 2024, with English translation.
Notice of Allowance issued Feb. 13, 2025 in U.S. Appl. No. 16/890,307.
Ukraine Office Action for UA Application No. a202405608 dated Mar. 19, 2025, with English Summary.
Chinese Office Action for CN Application 202110471500.3 dated Jul. 7, 2025, with English translation.
Chinese Office Action issued Apr. 22, 2025 in CN Application 202110471500.3.
Malaysian Examination Report for MY Application PI2024004946 dated Sep. 29, 2025.
Israel Notice Prior to Acceptance for ILSN 284621 dated Jun. 22, 2025.

* cited by examiner

METHOD OF MAKING E-VAPING CARTRIDGE WITH HYDROGEL IN CAVITY

PRIORITY STATEMENT

This application is a divisional of U.S. application Ser. No. 16/987,692, filed Aug. 7, 2020, which is a divisional of U.S. application Ser. No. 14/926,878, filed Oct. 29, 2015, which is a non-provisional application that claims priority to U.S. provisional app. No. 62/072,058, filed on Oct. 29, 2014, the entire contents of each of which are incorporated by reference in their entirety.

BACKGROUND OF THE INVENTION

Field of the Invention

Example embodiments relate generally to an e-vaping cartridge that may be operable to deliver a pre-vapor formulation from a supply reservoir to a heater. The heater may volatilize the pre-vapor formulation to form a vapor.

Related Art

E-vaping devices may be used by adult vapors as a portable means of vaping. Flavor systems within the device may be used to deliver a flavor to the adult vaper along with the vapor that may be produced by the e-vaping device. However, over extended periods of time a loss of flavoring may occur, thereby reducing a shelf-life of the flavoring system. A loss of flavoring may also occur when the flavor system is exposed to a high heat source. Such a loss of flavoring may reduce a sensory experience of the adult vaper.

SUMMARY OF THE INVENTION

At least one embodiment relates to an e-vaping cartridge.

In one embodiment, the e-vaping cartridge includes an inner tube extending in a longitudinal direction, the inner tube defining a channel with a first end and a second end; a heater traversing a portion of the first end of the channel, the heater being configured to heat a pre-vapor formulation to form a vapor; and a hydrogel located near the second end of the channel, the hydrogel including at least a first flavorant that is configured to release at least one of flavors and aromas to the vapor as the vapor passes the hydrogel.

In one embodiment, the hydrogel further includes a vapor former, water, and a biopolymer, and the biopolymer is one of agar, carrageenan, gelatin, sodium alginate, gellan gum, pectin and combinations thereof.

In one embodiment, the biopolymer is included in an amount ranging from about 0.01% by weight based on the weight of the hydrogel to about 2.0% by weight based on the weight of the hydrogel.

In one embodiment, the e-vaping cartridge further includes a reservoir containing the pre-vapor formulation; a filamentary wick configured to draw the pre-vapor formulation from the reservoir to the heater via capillary action, wherein the heater is a coil heater in fluid communication with the filamentary wick.

In one embodiment, the e-vaping cartridge further includes an outer tube extending in the longitudinal direction, the outer tube surrounding the inner tube, the reservoir being positioned in an outer annulus between the outer tube and the inner tube, wherein the coil heater traverses a portion of the inner tube.

In one embodiment, the vapor former is included in the hydrogel in an amount ranging from about 20% by weight based on the weight of the hydrogel to about 90% by weight based on the weight of the hydrogel.

In one embodiment, the vapor former is included in the hydrogel in an amount ranging from about 50% by weight based on the weight of the hydrogel to about 80% by weight based on the weight of the hydrogel.

In one embodiment, the water is included in the hydrogel in an amount ranging from about 5% by weight based on the weight of the hydrogel to about 40% by weight based on the weight of the hydrogel.

In one embodiment, the water is included in the hydrogel in an amount ranging from about 10% by weight based on the weight of the hydrogel to about 15% by weight based on the weight of the hydrogel.

In one embodiment, the first flavorant is included in the hydrogel in an amount ranging from about 0.2% by weight based on the weight of the hydrogel to about 15% by weight based on the weight of the hydrogel.

In one embodiment, the vapor former includes a diol and glycerin, the hydrogel including the diol and glycerin in range of ratios between about 1:4 and 4:1, the diol being one of propylene glycol, 1,3-propanediol, and combinations thereof.

In one embodiment, the hydrogel includes the diol and glycerin in a ratio of about 3:2.

In one embodiment, the first flavorant is at least one of natural and synthetically manufactured.

In one embodiment, the first flavorant is one of tobacco flavor, menthol, wintergreen, peppermint, herb flavors, fruit flavors, nut flavors, liquor flavors, roasted, minty, savory, cinnamon, clove, and combinations thereof.

In one embodiment, the hydrogel is at least one of nicotine-free and ethanol-free.

In one embodiment, the hydrogel is in the form a bead, a flake, a fiber, a thread, a ring, a film, a powder, a granule and combinations thereof.

In one embodiment, the pre-vapor formulation includes a second flavorant, the second flavorant being the same as the first flavorant.

In one embodiment, the pre-vapor formulation includes a second flavorant, the second flavorant being different that the first flavorant in the hydrogel.

In one embodiment, the e-vaping cartridge further includes a plug-space-plug filter near the end of the channel, the hydrogel being contained in a space within the plug-space-plug filter.

In one embodiment, the plug-space-plug filter includes two plugs made from a low efficiency filter material.

In one embodiment, the hydrogel is a coating, the coating being located on a portion of an inner surface of the outer tube near the second end of the channel.

At least one embodiment relates to an e-vaping device.

In one embodiment, the e-vaping device includes an outer tube extending in a longitudinal direction; an inner tube extending in the longitudinal direction within the outer tube, the inner tube defining a channel with a first end and a second end; a reservoir configured to contain a pre-vapor formulation; a heater traversing a portion of the first end of the channel and being configured to heat the pre-vapor formulation to form a vapor within the channel; and a coating on an inner surface of the outer tube near a second end of the channel, the coating including a hydrogel made from a vapor former, water, a flavorant, and a biopolymer, the hydrogel being configured to release at least one of flavors and aromas to the vapor as the vapor passes the hydrogel, wherein the biopolymer is one of agar, carrageenan, gelatin, sodium alginate, gellan gum, pectin and combinations thereof.

At least one embodiment relates to a cartridge.

In one embodiment, the cartridge includes a tube extending in a longitudinal direction, the tube having a first end and a second end; a heater traversing the first end of the tube; a shaped hydrogel positioned near the second end of the tube, the hydrogel made from a vapor former, water, a flavorant, and a biopolymer, the hydrogel being configured to release at least one of flavors and aromas to the vapor as the vapor passes the hydrogel, wherein the biopolymer is one of agar, carrageenan, gelatin, sodium alginate, gellan gum, pectin and combinations thereof.

DETAILED DESCRIPTION

Figure 1:
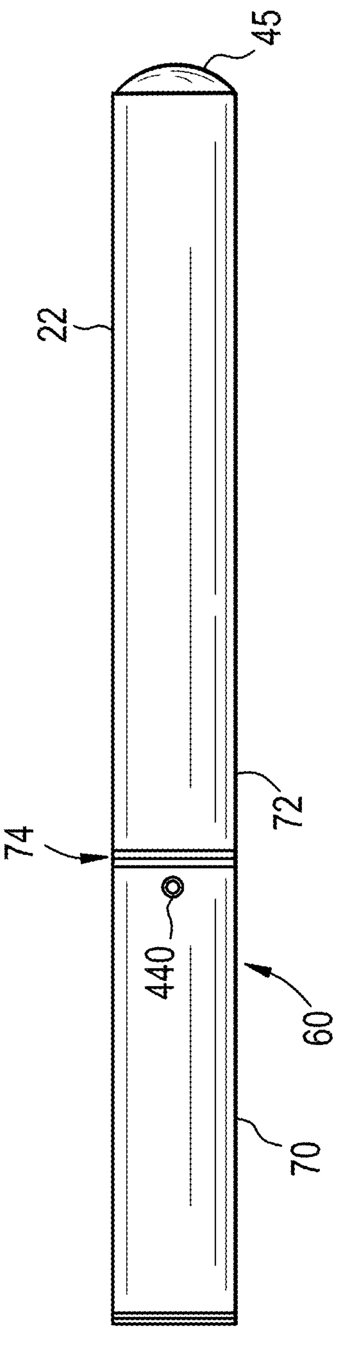
FIG. 1 is an illustration of a top planar view of an e-vaping device, in accordance with an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, items, regions, layers and/or sections, these elements, items, regions, layers, and/or sections should not be limited by these terms. These terms are only used to distinguish one element, item, region, layer, or section from another region, layer, or section. Thus, a first element, item, region, layer, or section discussed below could be termed a second element, item, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or items, but do not preclude the presence or addition of one or more other features, integers, steps, operations, elements, items, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

When the word "about" is used in this specification in connection with a numerical value, it is intended that the associated numerical value includes a tolerance of ±10% around the stated numerical value (or range of values).

Moreover, when reference is made to percentages in this specification, it is intended that those percentages are based on weight (i.e., weight percentages). The expression "up to" includes amounts of zero to the expressed upper limit and all values therebetween. When ranges are specified, the range includes all values therebetween such as increments of 0.1%.

Moreover, when the words "generally" and "substantially" are used in connection with geometric shapes, it is intended that precision of the geometric shape is not required but that latitude for the shape is within the scope of the disclosure. When used with geometric terms, the words "generally" and "substantially" are intended to encompass not only features which meet the strict definitions but also features which fairly approximate the strict definitions.

FIG. 1 is an illustration of a top planar view of an e-vaping device 60, in accordance with an example embodiment. The e-vaping device may generally be formed of two major sections: a first section 70 that may be a replaceable section (which may be referred to as a "cartridge" section), and a second section 72 that may be a reusable fixture containing a power supply. Optionally, both sections 70/72 may also be disposable sections. Both of the sections 70/72 may be enclosed by a housing 22. The outer housing 22 may be formed of any suitable material or combination of materials. The outer housing 22 may be cylindrical and may be formed at least partially of metal and may be part of the electrical circuit. Although the housing is described herein as cylindrical, other forms and shapes are also contemplated.

The sections 70/72 may be coupled together by a threaded joint 74, or by another mechanism such as a snug-fit connection, a snap-fit connection, a detent, a clamp and/or a clasp. Optionally, the two sections 70/72 may instead be one single section (that may be disposable), such that a joint 74 is not needed. One or more air inlets 440 may be included in the first section 70. It should be understood that the general configuration of the e-vaping device 60 shown in FIG. 1 (showing an outer-view of the e-vaping device 60) may be implemented for any of the embodiments of FIGS. 2-6 (which depict detailed cross-sectional views of various example embodiments of e-vaping devices).

Figure 2:
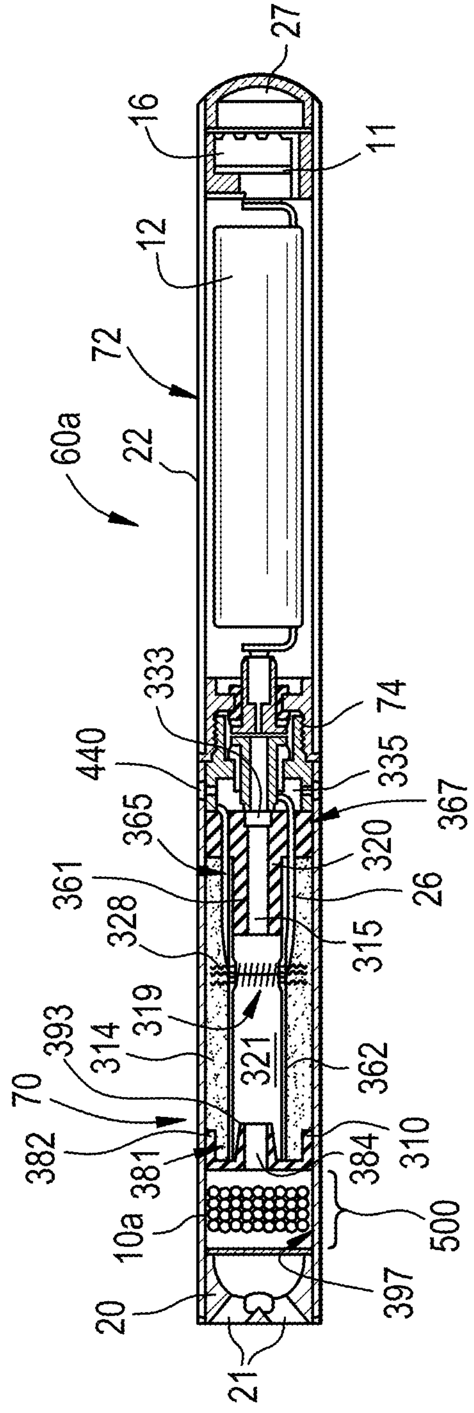
FIG. 2 is an illustration of a side cross-sectional view of an e-vaping device including a plurality of interconnected hydrogel flavor beads, in accordance with an example embodiment.

FIG. 2 is an illustration of a side cross-sectional view of an e-vaping device **60*a* including a plurality of interconnected hydrogel flavor beads 10, in accordance with an example embodiment. The first section 70 may extend in a longitudinal direction with an inner tube (or chimney) 362 coaxially positioned within the outer housing 22. The first section 70 may include a mouth-end insert 20 at one end, with outlets 21 located at ends of off-axis passages angled outwardly in relation to a longitudinal direction of the e-vaping device 60*a*. In an embodiment, there may be only a single centrally located outlet 21**.

A nose portion 361 of a gasket (or seal) 320 (e.g., "second gasket") may be fitted into an end portion 365 of the inner tube 362, where an outer perimeter 367 of the gasket 320 may provide a liquid-tight seal with an interior surface 397 of the outer housing 22. The gasket 320 may also include a central, longitudinal air passage 315, which may open into an interior of the inner tube 362 to define a central channel 321. A transverse channel 333 at a portion of the gasket 320 may intersect and communicate with the central, longitudinal air passage 315 of the gasket 320. This channel 333 assures communication between the central, longitudinal air passage 315 and a space 335 defined between the gasket 320 and the threaded connection 74.

A nose portion 393 of a gasket 310 (e.g., "first gasket") may be fitted into an end portion 381 of the inner tube 362 (e.g., "first channel"). An outer perimeter 382 of the gasket 310 provides a substantially liquid-tight seal with an interior surface 397 of the outer housing 22. The gasket 310 may include a central channel 384 (e.g., "second channel") disposed between the central passage 321 of the inner tube 362 and the mouth end insert 20.

A reservoir 314 may be contained in an annulus between the inner tube 362 and the outer housing 22, and between the first gasket 320 and the second gasket 310. Thus, the reservoir 314 may at least partially surround the central air passage 321. The reservoir 314 may contain a pre-vapor formulation. The reservoir 314 may also optionally include a storage medium (not shown), such as a fibrous and/or gauze structure, capable of suspending the pre-vapor formulation. The pre-vapor formulation may include one or more vapor formers, water, one or more "flavorants" (a compound providing flavor/aroma), and nicotine. For instance, the pre-vapor formulation may include a tobacco-containing material including volatile tobacco flavor compounds which are released from the pre-vapor formulation upon heating. The pre-vapor formulation may also be a tobacco flavor containing material or a nicotine-containing material. Alternatively, or in addition, the pre-vapor formulation may include a non-tobacco material(s). For example, the pre-vapor formulation may include water, solvents, active ingredients, ethanol, plant extracts and natural or artificial flavors. The pre-vapor formulation may further include a vapor former. Examples of suitable vapor formers are glycerine, diols (such as propylene glycol and/or 1,3-propanediol), etc. Because of the diversity of suitable pre-vapor formulation, it should be understood that these various pre-vapor formulations may include varying physical properties, such as varying densities, viscosities, surface tensions and vapor pressures.

A heater 319 may extend through the central air passage 321 of the inner tube 362. The heater 319 may be in contact with a filamentary wick 328, which may extend between opposing sections of the reservoir 314 so as to deliver the pre-vapor formulation from the reservoir 314 to the heater 319. Electrical leads 26 may be electrically connected to the heater in order to energize the heater when the device **60*a* is actively being used by an adult vaper. One or more air inlets 440 may be positioned near an end of the first section 70**.

The second section 72 may include a power supply 12, which may be a battery that is either disposable or rechargeable. The power supply 12 may be operable to apply a voltage across the heater 319. Thus, the heater 319 may volatilize the pre-vapor formulation according to a power cycle of either a time period, such as a 2 to 10 second period. The second section 72 may include a puff sensor 16 with control circuitry 11 which may be on a printed circuit board. The control circuitry 11 may also include a heater activation light 27 that may be operable to glow when the heater 319 is activated. The end cap 45 may be positioned on a distal end of the second section 72.

In an embodiment, the at least one vapor former of the pre-vapor formulation is selected from the group including a diol (such as propylene glycol and/or 1,3-propanediol), glycerin and combinations thereof. The at least one vapor former may be included in an amount ranging from about 20% by weight based on the weight of the pre-vapor formulation to about 90% by weight based on the weight of the pre-vapor formulation (for example, the vapor former may be in the range of about 50% to about 80%, more preferably about 55% to 75%, or most preferably about 60% to 70%). Moreover, in an embodiment, the pre-vapor formulation may include a diol and glycerin in a weight ratio that may range from about 1:4 to 4:1, where the diol may be propylene glycol, or 1,3-propanediol, or combinations thereof. This ratio may preferably be about 3:2.

The pre-vapor formulation may also include water. Water can be included in an amount ranging from about 5% by weight based on the weight of the pre-vapor formulation to about 40% by weight based on the weight of the pre-vapor formulation, and more preferably in an amount ranging from about 10% by weight based on the weight of the pre-vapor formulation to about 15% by weight based on the weight of the pre-vapor formulation.

The pre-vapor formulation optionally may include at least one flavorant in an amount ranging from about 0.2% to about 15% by weight (for instance, the flavorant may be in the range of about 1% to 12%, more preferably about 2% to 10%, and most preferably about 5% to 8%). The at least one flavorant may be a natural flavorant, or an artificial flavorant. For instance, the at least one flavorant may be selected from the group including tobacco flavor, menthol, wintergreen, peppermint, herb flavors, fruit flavors, nut flavors, liquor flavors, roasted, minty, savory, cinnamon, clove, and combinations thereof. The at least one flavorant of the pre-vapor formulation may be the same flavorant or a different flavorant than that is included in the hydrogel.

The pre-vapor formulation may also include nicotine. The nicotine may be included in the pre-vapor formulation in an amount ranging from about 1% by weight to about 10% by weight (for instance, the nicotine may be in the range of about 2% to 9%, or more preferably about 2% to 8%, or most preferably about 2% to 6%).

Encapsulated Flavorant

An encapsulated flavorant may be located on a distal end of the cartridge 70, where the heater 319 is positioned near the proximal end of the cartridge. For instance, a shaped "hydrogel" (or, a "gel"), that may be a semi-rigid or a semi-solid (jelly-like) colloidal dispersion of a solid with a liquid (which may include water), may contain the flavorant. In an embodiment, the hydrogel may be formed as a plurality of loose and/or interconnected beads 10*a* in a cavity 500 defined between the mouth-end insert 20 and the gasket 310. The beads 10*a* may have a diameter ranging from about 0.2 mm to about 2.0 mm each (for instance, the beads may be about 0.5 mm to 1.5 mm, or more preferably from about 0.75 mm to 1.25 mm).

The E-Vaping Device in Use

In use, an adult vaper may draw air from the e-vaping device 60 into their mouth via the air outlets 21 of the mouth-end insert 20. This draw of air may cause air to be pulled into the device 60 via the one or more air inlets 440, where this entering air is then directed through air passage 315, central channel 321, channel 384, and cavity 500 before being discharged from the outlets 21. This air movement creates a vacuum force that may be sensed by puff sensor 16, where the control circuitry 11 of the sensor 16 may cause an electrical circuit to close that includes the outer housing 22, the battery 12, the electrical leads 26, and the heater 319, such that the heater 319 may become electrically energized. The energized heater 319 may vaporize the pre-vapor formulation that may be drawn from reservoir 314 through wick 328 into the central channel 321. The vapor formed by the energized heater 319 may become entrained in the air flowing through the central channel 321, such that air and entrained vapor then passes through the cavity 500.

As the vapor contacts and flows between the beads 10*a* within the cavity 500, the vapor may absorb additional flavors and/or aromas from the beads. The flavorants used to form the beads 10*a* may be the same or different from the flavorants used in the pre-vapor formulation (described above) that may be vaporized at the heater 319. If the beads 10*a* are loose, the beads may be adhered to an inner wall 397 of the outer housing 22 via a food grade adhesive. If the beads 10*a* are interconnected, the beads 10*a* may be adhered to each other with a food grade adhesive.

Shaped Hydrogels

The encapsulated flavorant may be included in alternative forms, such that the encapsulated flavorant is not limited to beads 10*a*. Specifically, the encapsulated flavorant may be formed from gels/hydrogels that may be in any form such as beads, fibers, threads, flakes, powders, films, granules and/or rings (or tubes). In other embodiments, the encapsulated flavorants may be in the form of spray dried powders. Regardless of the type of the encapsulated flavorant that is used, the vapor within the e-vaping device 60 may flow around and/or through the encapsulated flavorant 10*a-e* (see all of FIGS. 2-6), in order to extract flavors and aromas from the flavorant 10*a-e* before exiting the e-vaping device 60*a-e* (as shown in FIGS. 2-6).

Hydrogels 10*a-e* may be formed by combining one or more vapor formers, water, one or more flavorants, and one or more biopolymers. In an embodiment, the encapsulated flavorant does not include nicotine and/or other tobacco components. The encapsulated flavorants may not include ethanol, which may interfere with the formation of a gel/hydrogel. In use, heat from the vapor passing through, over and/or around the hydrogel 10*a-e* (within cavity 500) may cause the flavorant portion of the hydrogel 10*a-e* to be removed from the hydrogel and to be carried to an adult vaper along with the vapor.

In an embodiment, the hydrogel 10*a-e* may be sized and configured to release flavorant over the course of about 1 to 200 puffs (for instance, the flavorant may be designed to be released within about 10 to 180 puffs, or about 20 to 160 puffs, or about 30 to 140 puffs, or about 30 to 120 puffs, or about 40 to 100 puffs, or about 50 to 80 puffs).

Additionally, the hydrogel 10*a-e* may have a density ranging from about 0.80 g/cm$^3$ to about 1.5 g/cm$^3$ at 20° C. (for instance, the density may be in a range of about 0.90 g/cm$^3$ to 1.4 g/cm$^3$, or about 1.00 g/cm$^3$ to 1.3 g/cm$^3$, or about 1.10 g/cm$^3$ to 1.20 g/cm$^3$, or about 0.8 g/cm$^3$ to 1.00 g/cm$^3$ at 20° C.).

The vapor former of the hydrogel may be selected from the group including a diol (such as propylene glycol, 1,3-propanediol, or combinations thereof), glycerin and combinations thereof. In an embodiment, the vapor former may be included in an amount ranging from about 20% by weight based on the weight of the hydrogel to about 90% by weight based on the weight of the hydrogel (for instance, about 50% to 80%, or about 55% to 75%, or about 60% to 70%). In an embodiment, the hydrogel 10*a-e* may include a diol (such as propylene glycol, 1,3-propanediol, or combinations thereof) and glycerin at a ratio of about 3:2.

The hydrogel 10*a-e* may include water. Water may be included in an amount ranging from about 5% by weight based on the weight of the hydrogel to about 40% by weight based on the weight of the hydrogel, more preferably in an amount ranging from about 10% by weight based on the weight of the hydrogel to about 15% by weight based on the weight of the hydrogel.

The hydrogel 10*a-e* may include the flavorant in an amount ranging from about 0.2% to 15% by weight based on the weight of the hydrogel (for instance, in the range of about 1% to 12%, or about 2% to 10%, or about 5% to 8%). The flavorant may be natural or artificial. For instance, the flavorant may be selected from the group including tobacco flavor, menthol, wintergreen, peppermint, herb flavors, fruit flavors, nut flavors, liquor flavors, roasted, minty, savory, cinnamon, clove, and combinations thereof. In an embodiment, the flavorant may be a non-tobacco flavorant. Also, the flavorant may be a volatile flavorant, such that the encapsulation in the hydrogel substantially prevents and/or abates migration of the flavorant during storage.

In an embodiment, the hydrogel may also include a biopolymer that may be included to thicken the consistency of the hydrogel. The biopolymer may be included in an amount ranging from about 0.01% by weight to about 2% by weight based on the weight of the hydrogel (for instance, the biopolymer may be in a range of about 0.02% to 1.5%, or about 0.05% to 1.0%, or about 0.075% to 0.9%, or about 0.03% to 0.4%). Biopolymers may include, without limitation, agar, kappa carrageenan, sodium alginate, gellan gum, pectin, and combinations thereof. In an embodiment, the hydrogel may be cross-linked with a cross-linking agent. In an embodiment, the biopolymer may be a food grade biopolymer. Also, the biopolymer may be a carbohydrate.

The hydrogel may be formed by dissolving agar (or another biopolymer) in an amount ranging from about 0.01% by weight based on the weight of the hydrogel to about 2% by weight based on the weight of the hydrogel in hot water having a temperature of about 99.9° C. while stirring until a clear pre-vapor formulation may be formed. The pre-vapor formulation may then be maintained at about 99.9° C. until the pre-vapor formulation may be combined with the remaining components of the gel/hydrogel. While the temperature of the pre-vapor formulation may be maintained, the remaining components may be mixed to form a system that may include at least one vapor former, flavors and/or aromas, and water in the amounts indicated above. The system may then be transferred to a sealed container and pre-heated to about 60° C. in a water bath that may be maintained at about 63° C. to form a warmed system. The warmed system may then be quickly added to the pre-vapor formulation and mixed with a high speed mixer for about 10 minutes while in the water bath to form a final homogeneous mixture having a temperature of about 60° C. The final homogeneous mixture may then be cooled in a cold water bath having a temperature of about 4° C. for about an hour to form a gel. The final homogeneous mixture may be cooled while in molds, if desired, to form a gel/hydrogel having a desired size and shape.

Figure 3:
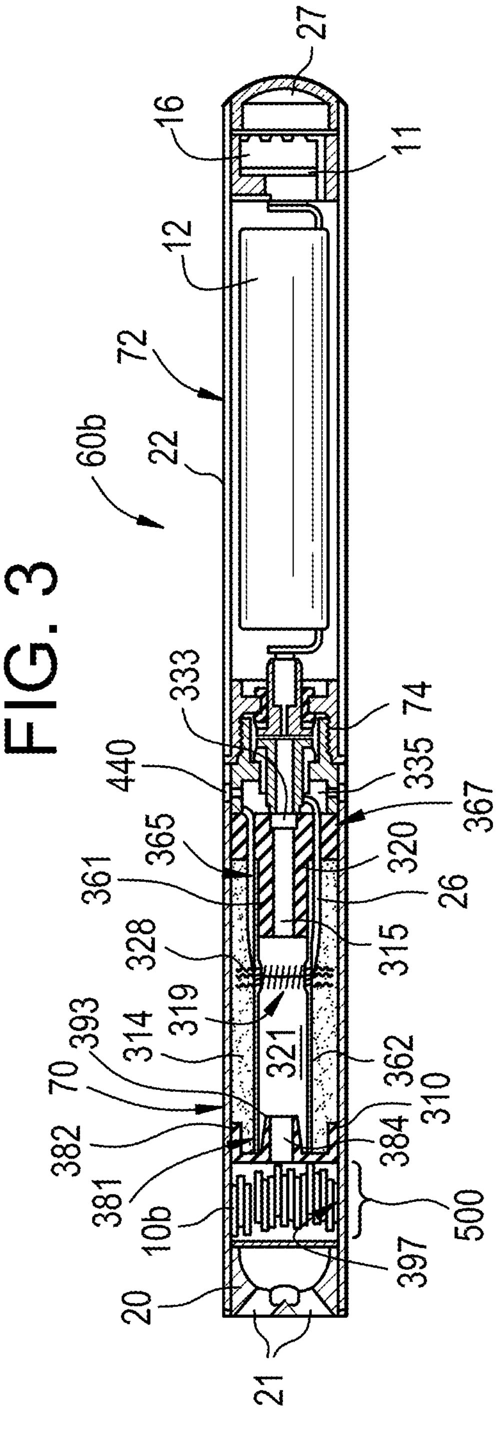
FIG. 3 is an illustration of a side cross-sectional view of an e-vaping device including a plurality of flavor fibers or threads, in accordance with an example embodiment.

FIG. 3 is an illustration of a side cross-sectional view of an e-vaping device 60*b* including a plurality of flavor fibers or threads 10*b*, in accordance with an example embodiment. Note that elements shown in this drawing that are common to FIG. 2 are not again described here, for brevity sake. The hydrogel loose and/or interconnected fibers or threads 10*b* may be contained in the cavity 500 between the mouth-end insert 20 and the gasket 310, similar to the embodiment of FIG. 2. The fibers and/or threads 10*b* may have a length ranging from about 2 mm to about 10 mm (for instance the length may preferably be about 3 mm to 9 mm, or more preferably about 4 mm to 8 mm, or most preferably about 5 mm to 7 mm), with a diameter ranging from about 0.1 mm to 2.0 mm (for instance, the diameter may preferably be about 0.5 mm to 1.5 mm, or more preferably about 0.75 mm to 1.25 mm). In this embodiment, as vapor flowing through central channel 321 contacts the fibers and/or threads 10*b*, the vapor may pick up additional flavors and/or aromas, similar to the embodiment shown in FIG. 2. As discussed above, the flavorants used to form the fibers and/or threads 10*b* may be the same or different than the flavorants used in the pre-vapor formulation that may be vaporized at the heater 319 (also see the description associated with the flavorants, as described in relation to FIG. 2). If the fibers 10*b* are loose, the fibers may adhere to an inner wall 397 of the outer housing 22 with a food grade adhesive. If the fibers 10*b* are interconnected, the fibers 10*b* may be adhered to each other with a food grade adhesive.

Figure 4:
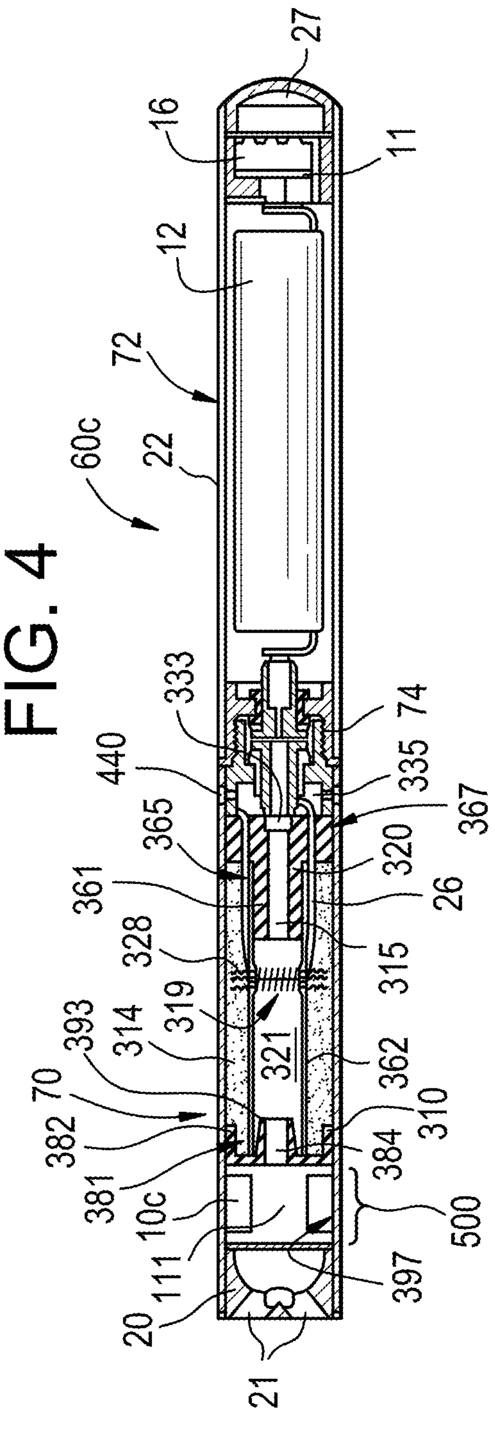
FIG. 4 is an illustration of a side cross-sectional view of an e-vaping device including a hydrogel flavor ring, in accordance with an example embodiment.

FIG. 4 is an illustration of a side cross-sectional view of an e-vaping device including a hydrogel flavor ring, in accordance with an example embodiment. Note that elements shown in this drawing that are common to FIG. 2 are not again described here, for brevity sake. In this embodiment, the hydrogel may be molded to form a ring (or tube) 10*c* that may be friction fitted within the outer housing 22 of the e-vaping device 60*c*. The ring 10*c* may have a width (running longitudinally along a longitudinal length of the device 60*c* when installed in the device 60*c*) ranging from about 2 mm to 10 mm (for instance, the ring may have a preferable length of about 3 mm to 9 mm, or more preferable about 4 mm to 8 mm, or most preferably about 5 mm to 7 mm). Moreover, the ring 10*c* may include a central passage 111 therethrough having a diameter ranging from about 0.2 mm to 5.0 mm (for instance, the diameter may preferably be about 0.3 mm to 4.0 mm). In other embodiments, the ring 10*c* may include a plurality of passages therethrough. In this embodiment, the vapor passing through central passage 111 within the ring 10*c* may pick up additional flavors and/or aromas as the vapor travels therethrough (as in the embodiments described above). As discussed above, the flavorants used to form the ring 10*c* may be the same or different than the flavorants used in the pre-vapor formulation that is vaporized at the heater 319.

Figure 5:
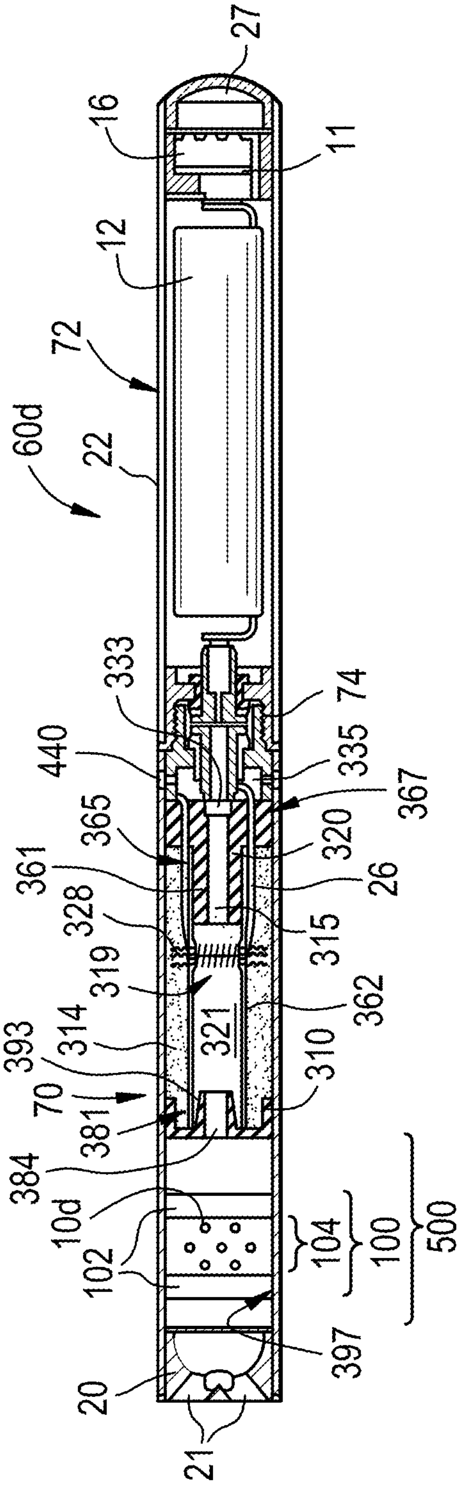
FIG. 5 is an illustration of a side cross-sectional view of an e-vaping device including a plug-space-plug filter with encapsulated hydrogel flavor beads, in accordance with an example embodiment.

FIG. 5 is an illustration of a side cross-sectional view of an e-vaping device 60*d* including a plug-space-plug filter 100 with encapsulated hydrogel flavor beads 10*d*, in accordance with an example embodiment. Note that elements shown in this drawing that are common to FIG. 2 are not again described here, for brevity sake. The beads 10*d* may be contained in a space 104 centrally located within the plug-space-plug filter 100. It is contemplated that the hydrogel beads 10*d* may be dispersed throughout a fibrous material 104*a* filling the space 104. The filter 100 may also include two plugs 102 made from a low efficiency filter material. For example, the plugs 102 may be formed of any of a variety of fibrous materials suitable for use in traditional e-vaping devices. The fibrous material 102/104*a* of the filter 100 may include cellulose acetate fibers, polyester fibers, polypropylene fibers, paper and the like. For example, the fibrous material 102/104*a* may include cellulose acetate that may be wrapped with a paper material, if desired. In this embodiment, the encapsulated flavorant within the beads 10*d* may be a spray dried powder, or the beads may be identical to the beads 10*a* described in relation to FIG. 2.

Figure 6:
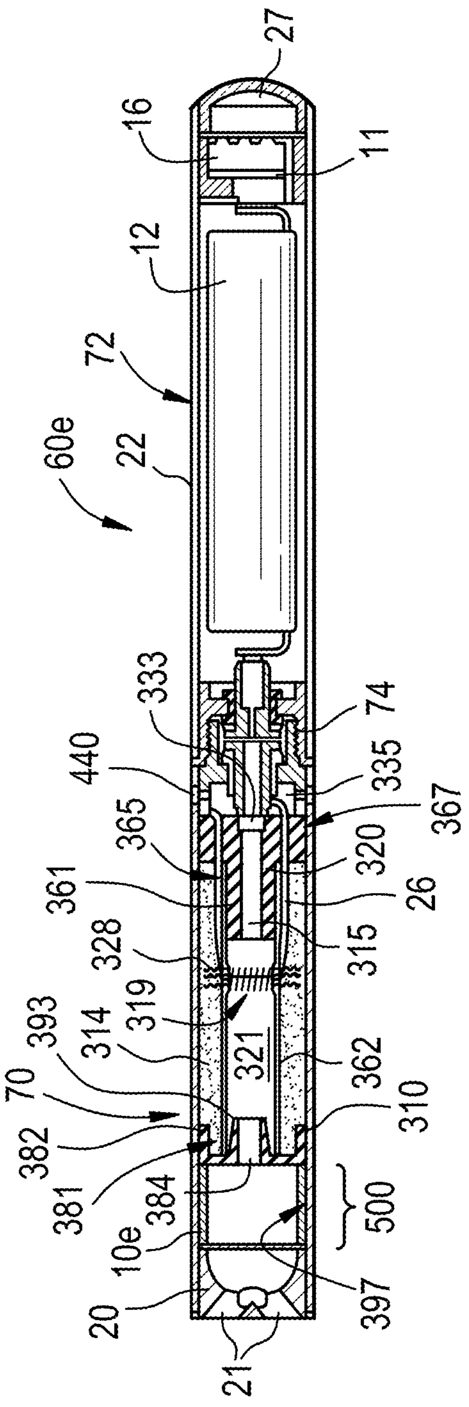
FIG. 6 is an illustration of a side cross-sectional view of an e-vaping device including a flavor coating on an inner surface of an outer housing, in accordance with an example embodiment.

FIG. 6 is a side cross-sectional view of an e-vaping device including a flavor coating on an inner surface of an outer housing, in accordance with an example embodiment. Note that elements shown in this drawing that are common to FIG. 2 are not again described here, for brevity sake. In this embodiment, the hydrogel may be a coating 10*e* on an inner surface 397 of the outer housing 22 on a distal end of cartridge (in cavity 500), near an outlet of central channel 384. Alternatively, the coating 10*e* may be located on an inner surface of the mouth end insert 20 (not shown).

In the embodiments described above, the e-vaping devices 60*a-e* may have a resistance to draw ranging from about 60 mm $H_2O$ to about 150 mm $H_2O$, or more preferably about 90 mm $H_2O$ to about 130 mm $H_2O$, or most preferably about 100 mm $H_2O$ to about 110 mm $H_2O$.

While the above embodiments reflect the use of gels/hydrogels positioned near a distal end of an e-vaping cartridge (where a heater is positioned near a proximal end of the cartridge) of an e-vaping device, it should be understood that the cartridge of the "e-vaping device" may take other forms besides the specific embodiments illustrated above. For instance, the cartridge for the "e-vaping device" may be inclusive of a cartridge for alternative types of e-vaping devices regardless of form, size or shape, and may include a cartridge for electronic hookahs, and the like, where alternative e-vaping devices may include a heater that may volatilize a pre-vapor formulation to form a vapor.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

We claim:

1. A method of making an e-vaping cartridge, comprising:

forming a housing defining an airflow path that includes a first airflow channel and an airflow cavity, the first airflow channel being a longitudinal airflow channel having a first end and a second end, the first end being an upstream end of the first airflow channel relative to a normal direction of airflow through the e-vaping cartridge during a normal operational use of the e-vaping cartridge, the first end of the first airflow channel being in communication with an air inlet that traverses through the housing, a heater being in communication with the first airflow channel, the heater being configured to heat a pre-vapor formulation to form a vapor, the airflow cavity being between the second end of the first airflow channel and at least one outlet of the e-vaping cartridge, a first cross-sectional flow area of the airflow cavity being larger than a second cross-sectional flow area of the first airflow channel; and providing a hydrogel with surfaces exposed to the airflow path within the airflow cavity.

2. The method of claim 1, wherein the hydrogel is spaced apart from the heater, the airflow cavity being downstream of the first airflow channel relative to the normal direction of airflow, and the normal direction of airflow enters the e-vaping cartridge through the air inlet and exits the e-vaping cartridge through the at least one outlet.

3. The method of claim 1, wherein the hydrogel is spaced apart from the heater and the second end of the first airflow channel, the airflow cavity being downstream of the first airflow channel relative to the normal direction of airflow, and the normal direction of airflow enters the e-vaping cartridge through the air inlet and exits the e-vaping cartridge through the at least one outlet.

4. The method of claim 1, further comprising:

connecting a first gasket to the second end of the first airflow channel.

5. The method of claim 4, further comprising:

forming a second airflow channel in a nose portion of the first gasket, a third cross-sectional flow area of the second airflow channel being smaller than the second cross-sectional flow area.

6. The method of claim 1, wherein the hydrogel releases at least one of flavors and aromas into the vapor as the vapor leaves the heater and passes the hydrogel.

7. The method of claim 1, further comprising:

providing a second gasket in the first airflow channel, the second gasket being upstream of the heater relative to the normal direction of airflow, and the normal direction of airflow enters the e-vaping cartridge through the air inlet and exits the e-vaping cartridge through the at least one outlet.

8. The method of claim 7, further comprising:

connecting a connector and a mouth end insert to a first end and a second end of the e-vaping cartridge, respectively, the second gasket being near the first end of the e-vaping cartridge and the airflow cavity being near the second end of the e-vaping cartridge, the mouth end insert defining the at least one outlet.

9. The method of claim 1, wherein the hydrogel is a colloidal dispersion including at least one flavorant.

10. The method of claim 1, wherein the hydrogel includes at least one flavorant, a vapor former, water, and a biopolymer.

11. The method of claim 10, wherein the biopolymer is one of agar, carrageenan, gelatin, sodium alginate, gellan gum, pectin, or a combination thereof.

12. The method of claim 11, wherein the biopolymer is included in the hydrogel in an amount ranging from about 0.01% by weight to about 2.0% by weight.

13. The method of claim 10, wherein the vapor former is included in the hydrogel in an amount ranging from about 20% by weight to about 90% by weight, and water is included in the hydrogel in an amount ranging from about 5% by weight to about 40% by weight.

14. The method of claim 13, wherein the vapor former includes a diol and glycerin, the hydrogel includes the diol and glycerin in range of ratios between about 1:4 and 4:1, and the diol is propylene glycol, 1,3-propanediol, or both propylene glycol and 1,3-propanediol.

15. The method of claim 14, wherein the hydrogel includes the diol and glycerin in a ratio of about 3:2.

16. The method of claim 10, wherein the at least one flavorant is included in the hydrogel in an amount ranging from about 0.2% by weight to about 15% by weight.

17. The method of claim 10, wherein the hydrogel is nicotine-free.

18. The method of claim 10, wherein the hydrogel is in the form a bead, a flake, a fiber, a thread, a ring, a film, a powder, a granule, or a combination thereof.

19. The method of claim 1, wherein the forming forms such that a first diameter of the airflow cavity is larger than a second diameter of the first airflow channel.

* * * * *